United States Patent [19]

Nomura et al.

[11] 3,838,807

[45] Oct. 1, 1974

[54] FRICTION WELDING MACHINE

[75] Inventors: Hiroshi Nomura; Masayoshi Uchida, both of Yokohama, Japan

[73] Assignee: Chiyoda Chemical Engineering & Construction Co., Ltd., Yokohama-shi, Japan

[22] Filed: Apr. 25, 1973

[21] Appl. No.: 354,437

[30] Foreign Application Priority Data
July 7, 1972 Japan.............................. 47-67575

[52] U.S. Cl..................... 228/2, 29/470.3, 156/580, 228/13
[51] Int. Cl........................................... B23k 27/00
[58] Field of Search ................. 29/470.3; 228/2, 13; 156/73, 580

[56] References Cited
UNITED STATES PATENTS

| | | | |
|---|---|---|---|
| 3,185,368 | 5/1965 | Holloway et al.............. | 29/470.3 X |
| 3,234,647 | 2/1966 | Hollander et al................. | 29/470.3 |
| 3,235,158 | 2/1966 | Hollander..................... | 29/470.3 X |
| 3,439,853 | 3/1969 | Deemie et al..................... | 228/2 |
| 3,599,857 | 8/1971 | Loyd et al........................ | 29/470.3 |

Primary Examiner—Andrew R. Juhasz
Assistant Examiner—Robert J. Craig
Attorney, Agent, or Firm—Holman & Stern

[57] ABSTRACT

A friction welding machine provided on its bed with a stationary head for tightly holding a first tube, a movable head for rotating a second tube being welded to the first tube, a work rest for securely supporting the second tube and a tail stock for pressing the second tube against the first tube and additionally equipped with outer upset-removing devices and an inner upset-removing device, whereby the tubes are firmly friction-welded together and moreover an outer upset and an inner upset are removed grown at the joint of the tubes while the tubes are still mounted on the friction welding machine.

8 Claims, 22 Drawing Figures

3,838,807

FRICTION WELDING MACHINE

FIELD OF THE INVENTION

This invention relates to a friction welding machine and more particularly to a type adapted to attain the friction welding of two elongate tubes and remove outer and inner upsets grown at the joint of said tubes while they are still mounted on the machine.

DESCRIPTION OF THE PRIOR ART

The prior art friction welding machine has generally been designed to unite relatively short workpieces by friction welding or fix a short member such as a joint to an elongate tube similarly by friction welding. To date, however, there has not been known any friction welding machine which can friction-weld elongate tubes together.

The reason why the prior art can not effect the friction welding of elongate tubes is that at least one of two workpiece tubes should be rotated at high speed with one end thereof brought into contact with the facing end of the other tube being friction-welded to said one tube, but that since there has not been developed any suitable device capable of unfailingly restricting the radial displacement of the rotating tube, this rotating tube is often subject to an excentric rotation depending on the magnitude of a force with which the tube is made to rotate or due to the off center position which might occur during rotation, thus presenting difficulties in attaining the accurate friction welding of tubes.

Further, even if the known friction welding machine can be made to effect the friction welding of elongate tubes, there has not yet been developed any such machine as can remove an inner upset grown at the joints of said tubes while they are still mounted on the machine. There has indeed been proposed a friction welding machine which enables an outer upset appearing at the joint of welded tubes to be removed by a cutting tool disposed on said machine. However, this friction welding machine has the drawback that said cutting tool is of a type which cuts off the outer upset while the welded tubes are rotated, and consequently that if the tube which is made to rotate is fitted with an elbow, the cutting of the outer upset will be impossible. Moreover, the above-mentioned type of the prior art friction welding machine is incapable of removing outer and inner upsets produced at the joint of a tube and an elbow while they are still mounted on the machine.

It is accordingly an object of this invention to provide a friction welding machine which enables elongate tubes to be unfailingly friction-welded and, in addition, outer and inner upsets appearing at the joint of welded tubes to be easily cut off while they are still placed on the machine.

Another object of the invention is to provide a friction welding machine capable of friction-welding an elbow to a tube and removing outer and inner upsets occurring at the joint of the elbow and tube.

According to an aspect of this invention, there is provided a friction welding machine which comprises a bed; a stationary head for firmly holding one tube fixed to one end of said bed in the lengthwise direction of said bed; a movable head for chucking another tube near that end at which it is friction-welded to said one tube so as to cause the friction-welded ends of both tubes to face each other in exact concentric relationship and rotating the chucked tube about its axis; a work rest for concentrically aligning both tubes in cooperation with the movable head; a tail stock for holding the opposite end of the chucked tube to its friction-welded end so as to press the chucked tube to said one tube; a support provided at the other end of the bed so as to hold an inner upset-removing device inserted through both tubes; and an outer upset-removing device formed of a tool bit and fitted to the movable head.

The movable head has a hollow spindle for allowing said another tube to penetrate therethrough and rotatable about its axis by a motor. Inside of that end portion of the hollow spindle which faces the fixed head and the opposite end portion of said spindle are received chucks rotatable concentrically with the hollow spindle, and closed with oil pressure so as to hold said another tube.

On that chucked surface of the movable head which faces the stationary head is mounted an outer upset-removing device so as to rotate with said movable head. This outer upset-removing device may be replaced by another type which consists of a single blade member whose inner edge constitutes a helical blade having a circular cross section or two blade members whose inner edges respectively constitute a helical blade having a semicircular cross section and, when combined, present a circular cross section. This modified type of outer upset-removing device may be provided on that side of the stationary head which is disposed opposite to the end face of the movable head or that side of the movable head which faces the stationary head.

An inner upset-removing device consists of a blade member whose outer edge constitutes a helical blade having a circular cross section or two blade members whose outer edges respectively constitute a helical blade having a semicircular cross section and, when combined, present a circular cross section, and is fixed to a support rest by means of a shaft. Alternatively, to cut off an inner upset occurring at the joint of a tube and an elbow, it is advised to rotate an arm having a circular cross section and curved complementarily with the inner wall of the elbow about the center of said curvature and pivotally attach a blade member to one end of said arm.

This invention will be described by way of examples with reference to the accompanying drawings, in which.

Figure 9:
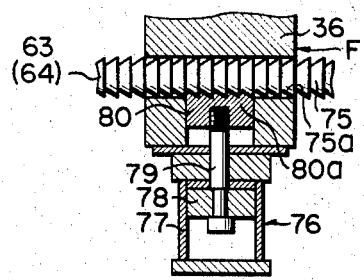
Figure 10:
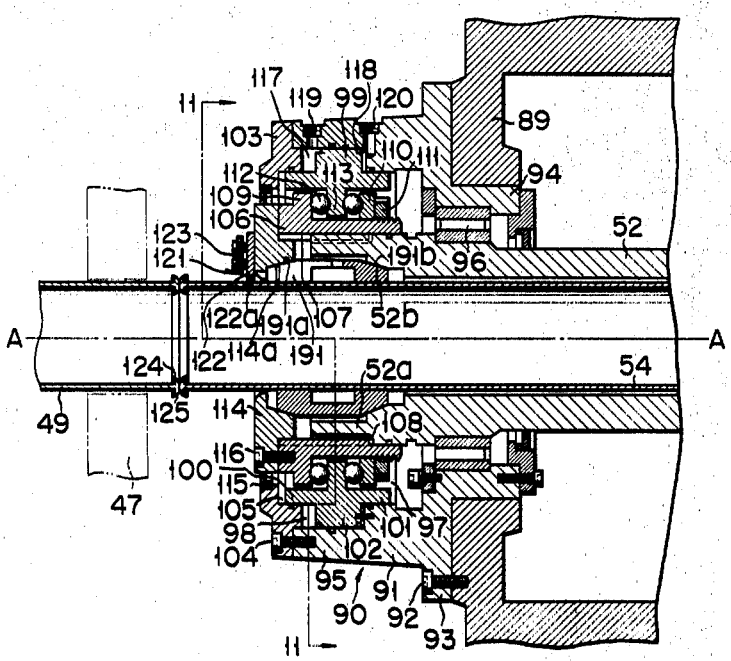
Figure 11:
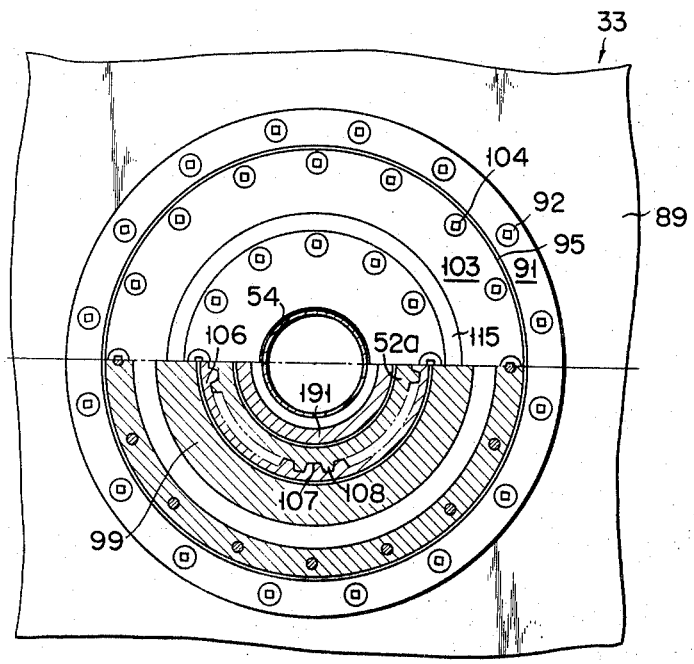
Figure 12:
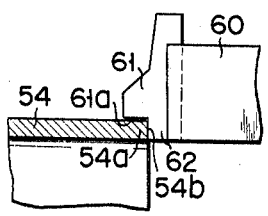
Figure 13:
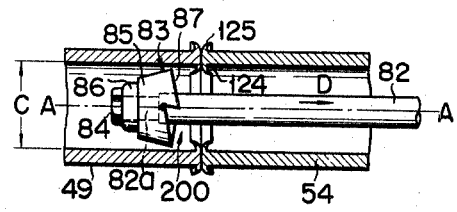
Figure 14:
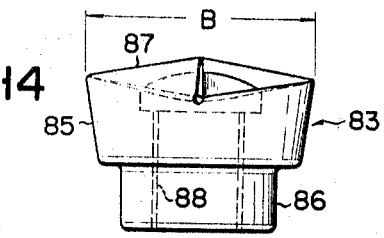
Figure 15:
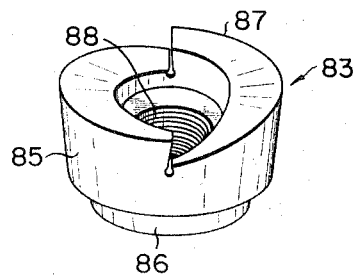
Figure 16:
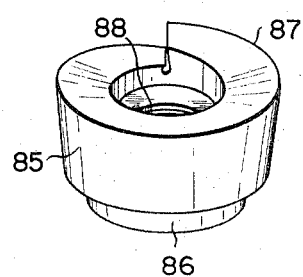
Figure 17:
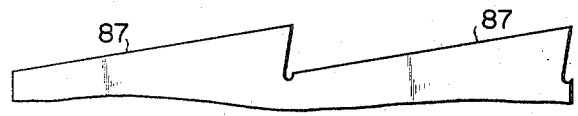
Figure 18:
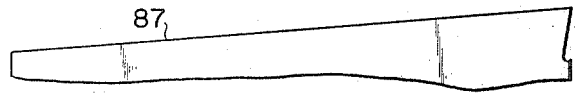
Figure 19:
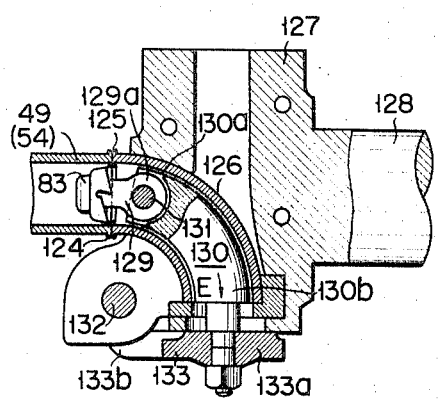
Figure 20:
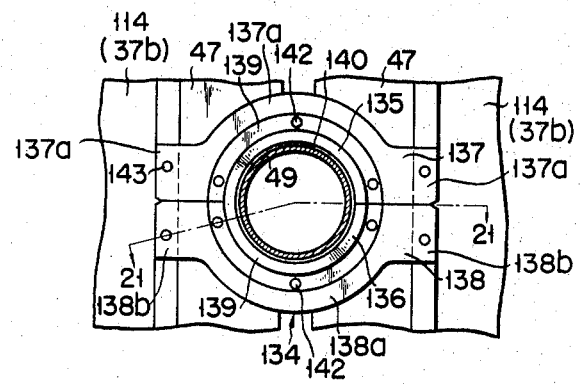
Figure 21:
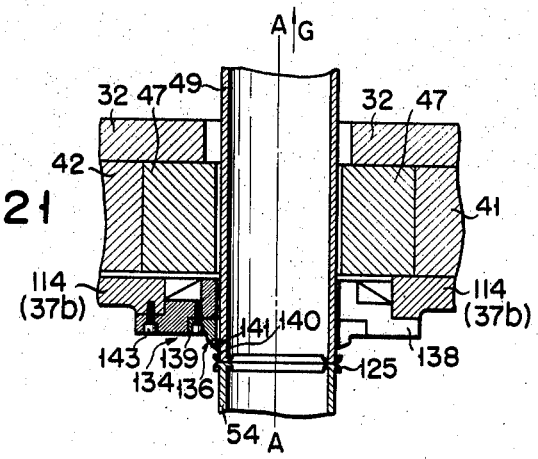

FIG. 9 indicates the clamping means of the inner upset-removing device;

FIG. 10 is a fractional cross sectional view of a movable head;

FIG. 11 is a cross sectional view on line 11—11 of FIG. 10;

FIG. 12 is a fractional cross sectional view of the chucked portion of the tail stock;

FIG. 13 presents the manner in which an inner upset is removed by an inner upset-removing device according to an embodiment of the invention included in the friction welding machine thereof;

FIG. 14 illustrates a blade member according to an embodiment of the invention;

FIG. 15 is a perspective view of the blade member of FIG. 14;

FIG. 16 indicates a blade member according to another embodiment of the invention;

FIG. 17 is a developed view of the blade member of FIG. 14;

FIG. 18 is a developed view of the blade member of FIG. 16;

FIG. 19 is a fractional cross sectional view of the present friction welding machine, where the blade member of FIG. 14 is applied in removing an inner upset grown at the joint of a tube and an elbow;

FIG. 20 is a front view of an outer upset-removing device according to an embodiment of the invention;

FIG. 21 is a cross sectional view on line 21—21 of FIG. 20; and

Figure 22:
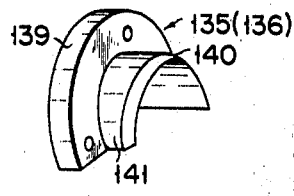

FIG. 22 shows a cutter according to an embodiment of the invention used in the outer upset-removing device of FIG. 20.

Figure 1:
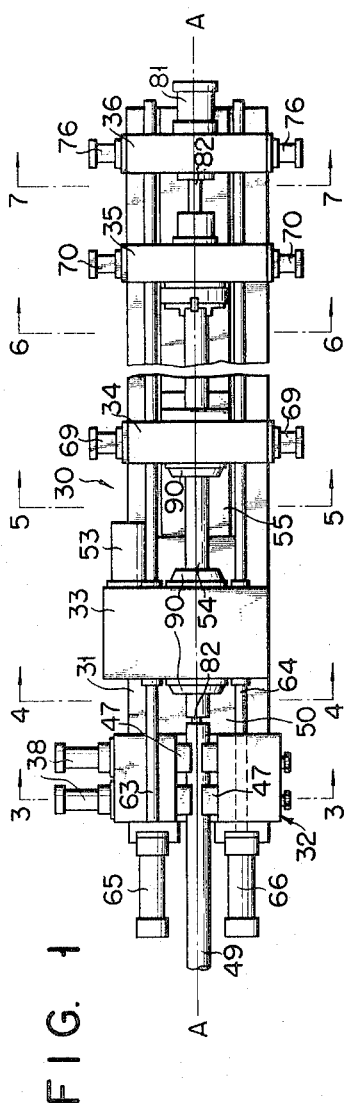
FIG. 1 is a plan view of a friction welding machine according to an embodiment of this invention.
Figure 2:
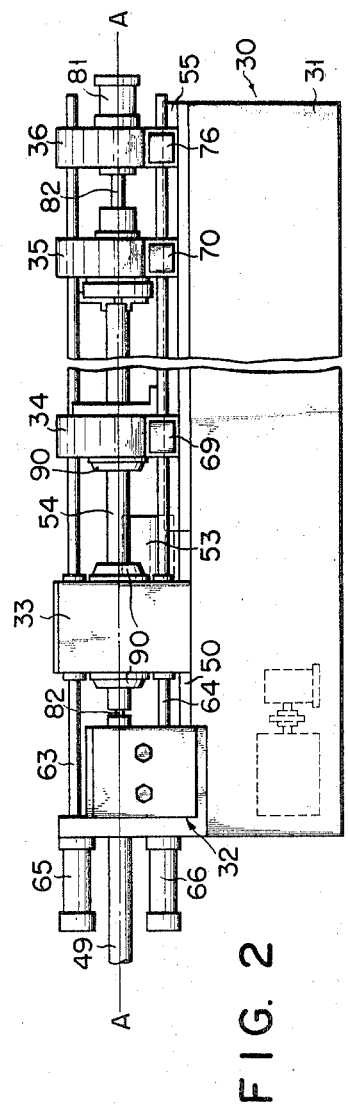
FIG. 2 is a front view of FIG. 1.

Referring to FIGS. 1 and 2, the friction welding machine 30 of this invention comprises a bed 31; a stationary head 32 fixed to the left upper surface of the bed 31; a movable head 33; a work rest 34; a tail stock 35; and a support 36 for an inner upset-removing device, all these members except for the first mentioned being arranged on the bed 31 from the left to the right in the order mentioned.

Figure 3:
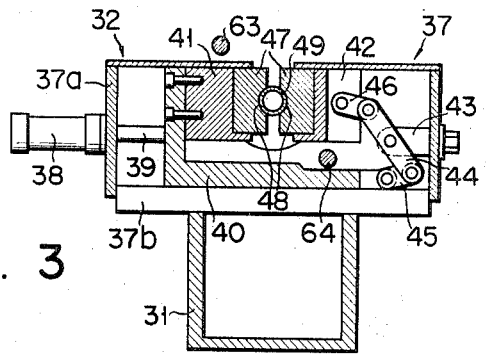
FIG. 3 is a cross sectional view on line 3—3 of FIG. 1, showing the structure of a stationary head.

As seen from FIGS. 1 and 3, there is fixed the cylinder of a hydraulic piston cylinder assembly 38 to the rear side plate 37a (as viewed from the friction welding machine 30) of the housing 37 of the stationary head 32. A piston rod 39 extending from the piston of the piston cylinder assembly 38 into the stationary head 32 causes a sliding member 40 with an L-shaped cross section fixed to the end of the piston rod 39 to reciprocate along the bottom plate 37b of the stationary head 32. To the inner wall of the upright portion of the sliding member 40 is fixed a support block 41. Opposite to this support block 41 is provided another support block 42 which can make a reciprocating movement. The support block 42 is connected to the sliding member 40 through a link 44 having its central part pivotally supported by an arm 43 extending from the front side of a housing 37 into the interior thereof, another link 45 pivotally supported at one end by the forward end of the sliding member 40 and at the other end by the lower end of the link 44, and still another link 46 pivotally supported at one end by the support block 42 and at the other end by the upper end of the link 44. The support block 42 can move through the operation of the piston cylinder assembly 38 to the same extent as the support block 41 in the opposite direction to that in which the block 41 travels. Both support blocks 41 and 42 are fitted with a pair of mutually facing work holders 47, in which there are cut out mutually facing engagement grooves 48 with a semicircular cross section extending parallel in the lengthwise direction of the bed 31. When the work holders 47 are drawn near to each other by operating the piston cylinder assembly 38, then a tubular workpiece or tube 49 can be firmly set in position parallel to the lengthwise direction of the bed 31.

Figure 4:
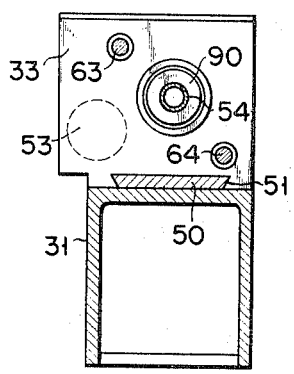
FIG. 4 is a cross sectional view on line 4—4 of FIG. 1, showing the structure of a movable head.

Referring now to FIG. 4, the movable head 33 has its bottom provided with a dovetail groove 51 engaging a dovetail 50 formed on the upper surface of the bed 31 so as to extend lengthwise thereof from the substantially central part of said bed 31 to the stationary head 32. Accordingly, the movable head 33 can slide along the dovetail 50 lengthwise of the bed 31.

The movable head 33 contains a hollow spindle 52 (FIG. 10) rotatable about the central axis A—A defined by the engagement grooves 48 of the work holders 47, said spindle 52 being driven by a motor 53 mounted on the movable head 33. Inside of both end portions of the spindle 52, there are received chucks rotatable with the spindle 52 and designed, as later described, to be closed with oil pressure and hold that end of a tubular member or tube 54 which is to be friction-welded to the aforesaid tube 49 already clamped by the work holders 47. On the bed 31 is formed a dovetail 55 extending from the substantially central part to the right end of said bed 31.

Figure 5:
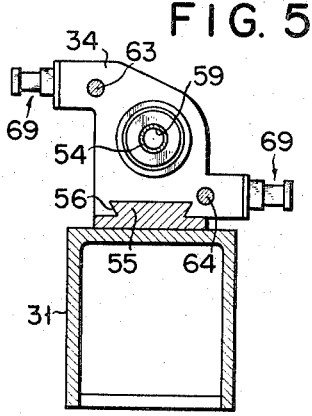
FIG. 5 is a cross sectional view on line 5—5 of FIG. 1, indicating the structure of a work rest.
Figure 6:
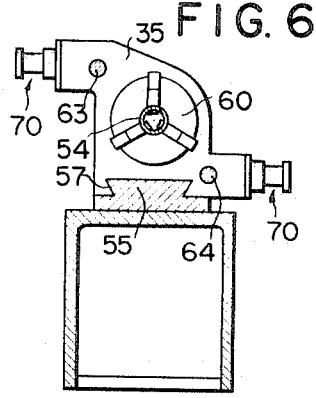
FIG. 6 is a cross sectional view on line 6—6 of FIG. 1, presenting the structure of a tail stock.
Figure 7:
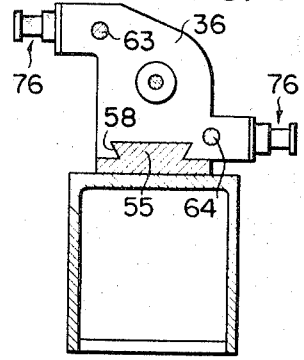
FIG. 7 is a cross sectional view on line 7—7 of FIG. 1, illustrating the structure of the support of an inner upset-removing device.

Referring to FIGS. 5 to 7, the work rest 34, tail stock 35 and support 36 of the inner upset-removing device respectively have dovetail grooves 56, 57 and 58 cut out at the bottom for engagement with the dovetail 55. The work rest 34 and tail stock 35 are provided with hydraulically operated chucks 59 and 60 respectively which rotate about the central axis A—A, while holding the central part and rear end portion of the tube 54 respectively. The chucks 59 are of the same structure as those of the later described movable head 33. The oil pressure chuck 60 is, for example, a three-jaw type illustrated in FIG. 6. The jaws 61 of the chuck 60 of the tail stock 35 each have, as shown in FIG. 12, an inner wall 61a for holding the outer periphery of the rear end portion 54a of the tube 54 and an abutment 62 disposed adjacent to said inner wall 61a and projecting into the chuck 60 so as to engage the rear end face 54b of the tube 54.

As seen from FIGS. 1 to 7, a pair of tension rods 63 and 64 parallel to, and symmetrical with respect to, the central axis A—A penetrate the stationary head 32, movable head 33, work rest 34, tail stock 35 and the support 36 of the inner upset-removing device. The tension rods 63 and 64 each have the left end fixed to the pistons of hydraulic piston cylinder assemblies 65 and 66 respectively, the cylinders of which are attached to the stationary head 32, thereby making reciprocating movements by the operation of said piston cylinder assemblies 65 and 66.

The movable head 33 and tension rods 63 and 64 are fixed together for joint movement by the operation of the piston cylinder assemblies 65 and 66. On those parts of the tension rods 63 and 64 which are over the working areas of the work rest 34 and tail stock 35 are formed engagement sections 67 and 68 consisting of saw teeth 67a and 68a, each of which has a cross section tapering to the right.

Figure 8:
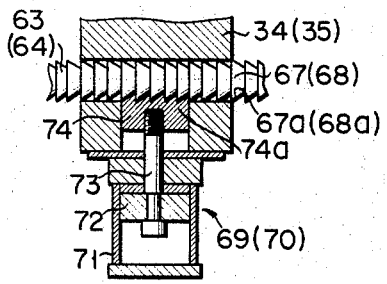
FIG. 8 shows the clamping means of the tail stock.

The work rest 34 and tail stock 35 are provided with clamping mechanisms 69 and 70 for locking said work rest 34 and tail stock 35 with the corresponding engagement sections 67 and 68 of the tension rods 63 and 64. As shown in FIG. 8, these clamping mechanisms 69 and 70 each comprise a cylinder 71 fixed to the work rest 34 and tail stock 35; a hydraulically operated piston 72 fitted into said cylinder 71; and an engagement strip 74 fixed to a piston rod 73 by a screw disposed at the end thereof and provided with teeth 74a matching those of the engagement sections 67 and 68 of the tension rods 63 and 64 when compressed oil is introduced into the cylinder 71, the piston 72 is driven with the resultant engagement of the engagement strip 74 with the engagement sections 67 and 68 of the tension rods 63 and 64, thereby causing the work rest 34 and tail stock 35 to be clamped by the tension rods 63 and 64. Conversely, where compressed oil is drawn off from the cylinder 71, the engagement strip 74 is released from the engagement sections 67 and 68 to set the work rest 34 and tail stock 35 free from the tension rods 63 and 64.

On those parts of the tension rods 63 and 64 which are over the working area of the support 36 of the inner upset-removing device is formed, as shown in FIG. 9, an engagement section 75 consisting of saw teeth 75a, each of which has a cross section tapering to the left. The support 36 is fitted with a clamping mechanism 76 of a similar structure to those of the work rest 34 and tail stock 35 in order to be locked with the above-mentioned engagement section 75. In the clamping mechanism 76 of the support 36, a cylinder 77 fixed to the support 36 corresponds to the cylinder 71 of the clamping mechanisms 69 and 70, a piston 78 to the piston 72, a piston rod 79 to the piston rod 73 and an engagement strip 80 to the engagement strip 74. It will be noted that since the teeth 80a of the engagement strip 80 each bear a shape matching those of the engagement section 75, the teeth 80a are tapered in the opposite direction to the teeth 74a of the engagement strip 74.

To the right end of the support 36 is fixed the cylinder of a hydraulic piston cylinder assembly 81. To the piston is fixed a narrow supporting rod 82 disposed in alignment with the central axis A—A and extending near the stationary head 32 so as to reciprocate with the piston of said assembly 81.

Referring to FIG. 13, a cutter head 83 for removing an inner upset is fixed by a nut 84 to the end 82a of the supporting rod 82. The cutter head 83 consists, as shown in FIGS. 13 to 15, of a frustum-shaped cutter 85 tapering toward the stationary head 32; a mount 86 integrally formed on that side of the cutter 85 which faces the stationary head 32; and a pair of cutting edges 87 each provided on that outer periphery of the cutter 85 which faces the support 36 in a helical form extending along the semicircular section of said outer periphery, the maximum diameter B of a circle defined by said paired cutting edges 87 being chosen to be substantially equal to the inner diameter C of the tubes 49 and 54. The cutter head 83 has a concentrically formed female screw 88, into which there is fitted a male screw formed at the end 82a of the supporting rod 82, said male screw engaging a nut 84. FIG. 17 is a developed view of the cutting edges 87 of the cutter head 83 in FIGS. 13 to 15. The cutter head 83 and operating rod 82 constitute an inner upset-removing device 200. As shown in FIG. 16, the paired cutting edges 87 in FIGS. 13 to 15 may be replaced by a single cutting edge extending along the entire periphery of the cutter head 83. FIG. 18 is a developed view of said single cutting egdge 87.

Referring to FIG. 10, that wall 89 of the movable head 33 which faces the stationary head 32 is fitted with a hydraulic piston cylinder assembly 90 disposed coaxially with the central axis A—A. The aforementioned hollow spindle 52 penetrates the movable head 33. The left end 52a of the spindle 52, namely, that end which faces the stationary head 32 has an increased inner diameter, wherein there is received a collet chuck 191 having the same slots as in a conventional collet chuck formed in the axial direction so as to have its diameter broadened by its own elasticity. The right and left peripheral end portions of said collet chuck 191 constitute tapered planes 191a and 191b whose diameter gradually decreases toward the end face. That inner wall of the hollow spindle 52 which faces the tapered plane 191b constitutes a tapered plane 52b so as to match said tapered plane 191b.

The cylinder unit 91 of a piston cylinder assembly 90 consists of a flange 93 fixed to a wall 89 by bolts 92, a hollow shaft 94 extending to the right from the flange 93 into the wall 89 and a cylinder 95 extending to the left from the flange 93. The hollow spindle 52 is rotatably received in the hollow shaft 94 by means of a radial bearing 96.

The right inner wall portion 97 of the cylinder 95 has a smaller inner diameter and the left inner wall portion 98 thereof has a larger inner diameter. The left and right portions 100 and 101 of a piston 99 have a smaller diameter and the central portion 102 thereby has a larger diameter. The smaller diameter portion 101 and larger diameter portion 102 of the piston 99 slidably contact the smaller inner diameter portion 97 and larger inner diameter portion 98 of the cylinder 95 respectively. To the left end of the cylinder 95 is fixed a ring-shaped end plate 103 by screws 104 to close said left end. Against the inner periphery of a blind hole 105 formed in the inner wall of the end plate 103 slidably abuts the smaller diameter portion 100 of the piston 99. The smaller diameter portions 100 and 101 and larger diameter portion 102 of the piston 99 have such lengths that the piston 99 can reciprocate in the axial direction with these three portions 100, 101 and 102 in slidable contact with the inner periphery of the blind hole 105 of the end plate 103, the smaller inner diameter portion 97 of the cylinder 95 and the larger inner diameter portion 98 of said cylinder 95 respectively.

Between the piston 99 and the left end portion 52a of the hollow spindle 52 is positioned a slider 106. On the inner wall of the slider 106 is formed a spline 107 extending in the axial direction, said spline 107 engaging another spline 108 provided on the outer periphery of the left end portion 52a of the hollow spindle 52 so as to slide in the axial direction (see FIGS. 10 and 11). The slider 106 is provided with a flange 109 on the left side outer periphery and also with a ring-shaped abutment 110 on the right side outer periphery, said abutment 110 being located by a ring nut 111. These flange 109 and abutment 110 clamp a flange 113 extending inward from the central part of the piston 99 by means of thrust bearings 112.

Into the end plate 103 is rotatably fitted a pusher 114 for operating the collet chuck 191 through a sleeve 115. Said pusher 114 is fixed to the left end face of the slider 106. The inner wall of the right side portion of the pusher 114 constitutes a tapered plane 114a to match the left side tapered plane 191a of the collet chuck 191.

The cylinder 95 is bored with compressed oil ports 119 and 120 respectively communicating with a chamber 117 defined by said cylinder 95, the end plate 103, and the larger diameter portion 102 and smaller diameter portion 101 of the piston 99 and also with a chamber 118 defined by said cylinder 95 and the larger diameter portion 102 and smaller diameter portion 101 of said piston 99.

To the left end face of the pusher 114 is fitted an outer upset-removing device 121 which consists of a cutting tool 122 whose cutting edge 122a extends inward in the radial direction so as to substantially abut against the tube 54 and a fixture 123 for fixing said cutting tool 122 to the left end face of the pusher 114. For simplification, FIG. 11 omits said outer upset-removing device 121. Also on the opposite side of the movable head 33 to the stationary head 32 is provided a chucking piston cylinder assembly 90 having the same structure as shown in FIG. 10.

There will now be described the operation of a friction welding machine according to this invention.

A tube 54 is inserted into the friction welding machine from the left side of the stationary head 32 and further pushed through the hollow spindle 52 of the movable head 33 and the chucks 59 of the work rest 34 so as to cause the right end 54a of the tube 54 abut against the abutment 62 of the chuck 60 of the tail stock 35. When the tube 54 is introduced into the friction welding machine, the supporting rod 82 having its end fitted with the cutter head 83 gradually approaches the left side of the tube 54. When the right end of the tube 54 strikes the abutment 62, the left end of said tube 54 is brought, as shown in FIGS. 1, 2 and 10, to the prescribed position between the stationary head 32 and movable head 33.

Another tube 49 is inserted between the work holders 47 from the left side of the stationary head 32, such that the right end of the tube 49 contacts the left end of the first mentioned tube 54. Thereafter, the cutter head 83 disposed at the end of the operating rod 82 is made to pass through the left end of the tube 54 into the tube 49 by moving the support 36 of the inner upset-removing device 200 toward the stationary head 32.

When the above-mentioned preparatory steps have been taken, the piston cylinder assemblies 38 of the stationary head 32 are operated to close the work holders 47, thereby fixing the tube 49 to the stationary head 32. When, in FIG. 10, compressed oil is conducted into the chamber 117 through the port 119 bored in the cylinder 95 of the movable head 33, then the piston 99 travels to the right, causing the slider 106 and pusher 114 also to move to the right through the thrust bearings 112. Since the tapered plane 114a of the pusher 114 is pressed against the tapered plane 191a of the collet chuck 191, said chuck 191 is closed to clamp the tube 54. (When compressed oil enters the chamber 118 through the port 120, the piston 99 moves to the left to reverse the above-mentioned operation, with the result that the collet chuck 191 is opened and the tube 54 is released.) The clamping mechanisms 69, 70 and 76 of the work rest 34, tail stock 35 and support 36 respectively can be operated to let the engagement strips 74 and 80 engage the engagement sections 67, 68 and 75 of the tension rods 63 and 64 (see FIGS. 8 and 9). The chucks 59 and 60 of the work rest 34 and tail stock 35 respectively are closed to clamp the tube 54.

With the clamping mechanisms 69 and 70 operated as above-mentioned, the motor 53 (FIGS. 1 and 2) of the movable head 33 is driven quickly to rotate the tube 54 through the hollow spindle 52, splines 107 and 108 and collet chucks 191. When, under this condition, the piston cylinder assemblies 65 and 66 of the stationary head 32 are operated to cause the tension rods 63 and 64 to move to the left, then the tube 54 also moves to the left to the same extent as the tension rods 63 and 64 together with the movable head 33, work rest 34 and tail stock 35. Accordingly, the tube 54 rotates with the left end pressed against the right end of the tube 49. The abutting parts of both tubes 54 and 49 are considerably heated by friction and are brought to a state easily weldable under pressure. In this case, the clamping mechanism 76 remains open to prevent the support 36 from moving to the left. When this condition is attained, the motor 53 is brought to rest so as to stop the rotation of the tube 54. Further, the piston cylinder assemblies 65 and 66 are operated to move the tension rods 63 and 64 to the left, causing the left end of the tube 54 to be forcefully pressed against the right end of the tube 49. When allowed to cool for a certain length of time defined by the type of both tubes 49 and 54, they are fully friction-welded.

When both tubes 49 and 54 are thus friction-welded, there are grown, as shown in FIGS. 10 and 13, an inner upset 124 inside of the joint of the welded tubes 49 and 54 and an outer upset 125 outside of said joint.

After completion of friction welding, the work rest 34 and tail stock 35 are released from the clamping mechanisms 69 and 70. Compressed oil is conducted into the chamber 118 through the port 120 to open the collet chuck 191 (FIG. 10). The motor 53 is driven to rotate the cutting tool 122 through the slider 113 and pusher 114. The piston cylinder assemblies 65 and 66 are operated again to move the tension rods 63 and 64 to the left. Then the movable head 33 alone travels to the left together with the tension rods 63 and 64, while the tube 54 is brought to rest. Accordingly, the outer upset 125 is removed by the cutting edge 122a of the cutting tool 122. When the clamping mechanism 76 of the support 36 is operated to clamp the support 36 to the tension rods 63 and 64, and the supporting rod 82 is made to move to the right side of FIGS. 1 and 2 by operating the piston cylinder assembly 81, then the cutter head 83 travels with the supporting rod 82 in the direction of the arrow D indicated in FIG. 13 so as to cut off the inner upset 124 by the cutting edge or edges 87 (FIGS. 15 or 16).

Referring to FIG. 8, where the engagement strips 74 of the clamping mechanisms 69 and 70 of the work rest 34 and tail stock 35 engage the engagement sections 67 and 68 of the tension rods 63 and 64, then the tension rods 63 and 64 unfailingly cause the tube 54 to move to the left through the work rest 34 and tail stock 35.

Referring to FIG. 9, where the engagement strip 80 of the clamping mechanism 76 of the support 36 engages the engagement sections 75 of the tension rods 63 and 64 and the piston cylinder assembly 81 moves the cutter head 83 (FIG. 13) to the right through the supporting rod 82, then the support 36 is prevented from traveling to the left by a leftward acting reactional force F applied to said support 36.

Where the tension rods 63 and 64 are moved to the left with the engagement strip 74 of the clamping mechanism 70 of the tail stock 35 engaged with the engagement sections 67 and 68 of the tension rods 63 and 64, then the abutment 62 formed, as shown in FIG. 12, on the jaw 61 of the chuck 60 of the tail stock 35 is pressed against the right end of the tube 54, causing said tube 54 to travel to the left to the same extent as the leftward movement of the tension rods 63 and 64.

FIG. 19 represents the case where an elbow 126 is friction-welded to the tube 49 mounted on the immovable head 32. The elbow 126 is supported by a holding member 127 having a shaft 128 clamped by the collet chucks 191 of the movable head 33. The cutter head 83 (of the same structure as shown in FIGS. 13 to 15) for removing the inner upset 124 has a shaft 129 projecting to the left. The right end 129a of said shaft 129 is pivoted by a pivot 131 to the left end 130a of a mandrel 130 movable in the elbow 126 along its curved axis. That part of the holding member 127 which faces the center of the curvature of the elbow 126 is fitted with a pivot 132. TO this pivot 132 is pivoted one end 133b of an arm 133 having the other end 133a connected to the right end 130b of the mandrel 130.

Where, in the embodiment of FIG. 19, the arm 133 rotates about the pivot 132 in the direction of the arrow E, then the cutter head 83 moves rightward to cut off the inner upset 124. It is also possible to cause the shaft 128 of the holding member 127 to be clamped between the work holders 47 of the stationary head 32 instead of letting said shaft 128 be held by the collet chucks 191 of the movable head 133. Under this condition, the elbow 126 is friction-welded to the tube 54.

FIGS. 20 to 22 illustrate an outer upset-removing device according to another embodiment of this invention. This outer upset-removing device 134 may be fixed to the pusher 114 of the piston cylinder assembly 90 disposed on that side of the movable head 33 which faces the stationary head 32 or to the right end plate 37b of the stationary head 32.

The outer upset-removing device 134 consists of a pair of cutting tools 135 and 136 each having a semicircular cross section and a pair of fitting parts 137 and 138. The cutting tools 135 and 136 each consist, as shown in FIG. 22, of a flange 139 and a cutting element 141 whose inner edge constitutes a slightly helical blade 140 having a semicircular cross section. The fitting parts 137 and 138 are in a semicircular form and consist of cutting tool-fitting sections 137a and 138a to which the flanges 139 of the cutting tools 135 and 136 are fitted by bolts 142 and fixing members 137b and 138b which extend to the right and left of said cutting tool-fitting sections 137a and 138a respectively and are fixed to the right end plate 37b of the stationary head 32.

Where, in the embodiment of FIGS. 20 to 22, the tube 49 is released from the work holders 47 by operating the piston cylinder 38 (FIG. 1) after friction welding of said tube 49, and the tubes 49 and 54 are jointly moved in the direction of the arrow G indicated in FIG. 21, then the outer upset 125 is cut off by the cutting edges 140 of the cutting tools 135 and 136.

The cutter head 83 of the inner upset-removing device 200 shown in FIGS. 13 to 15 and the cutting tools 135 and 136 of the outer upset-removing device shown in FIGS. 20 to 22 respectively have two cutting edges disposed symmetrical with respect to the central axis A—A. When the inner and outer upsets are removed, cutting forces are applied in symmetrical relationship to the joint of the tubes 49 and 54, so that said removal can be effected smoothly. The inner and outer upset-removing devices may have one or more than two cutting edges.

What we claim is:

1. A friction welding machine comprising:

a bed;

a stationary head fixed to the upper surface of one end portion of the bed and provided with work holders for clamping a first tube in the lengthwise direction of the bed;

a movable head disposed on the bed adjacent to the stationary head so as to slide lengthwise of the bed and provided with a first chucking means for clamping one end portion of a second tube brought closely to face the first tube in concentric relationship therewith;

a motor received in the movable head to rotate the first chucking means;

a work rest provided on the bed adjacent to the opposite side of the movable head to the stationary head so as to slide lengthwise of the bed and fitted with a second chucking means for clamping the central part of the second tube so as to enable it to rotate concentrically with the first tube;

a tail stock positioned adjacent to the opposite side of the work rest to the movable head so as to slide lengthwise of the bed and equipped with a third chucking means for clamping the other end of the second tube by being engaged with said other end;

a support mounted on the bed adjacent to the opposite side of the tail stock to the work rest so as to slide lengthwise of the bed;

an inner upset-removing device comprising a supporting rod extending from the support toward the stationary head concentrically with the second tube and a cutter head fitted to that end of the supporting rod which faces the stationary head;

an outer upset-removing device for cutting off an outer upset grown at the joint of the first and second tubes;

a pair of tension rods penetrating the movable head, work rest, tail stock and support in parallel relationship with the bed and symmetrically with respect to the central axis so as to reciprocate lengthwise of the bed, said movable head being fixed to the tension rods for joint reciprocation therewith;

a first clamping mechanism for effecting engagement and disengagement between the work rest and tension rods;

a second clamping mechanism for effecting engagement and disengagement between the tail stock and tension rods; and a third clamping mechanism for carrying out engagement and disengagement between the support and tension rods, wherein the mutually facing ends of the first and second tubes are pressed against each other, both tubes are subjected to relative rotation to heat the mutually facing ends to a sufficiently high temperature to attain friction welding, the mutually facing ends are more forcefully pressed against each other to effect the friction welding of both tubes, and thereafter inner and outer upsets occurring at the joint of the first and second tubes are cut off while welded tubes are still mounted on the friction welding machine.

2. A friction welding machine according to claim 1 characterized in that the movable head contains a hollow spindle rotated by the motor concentrically with the first and second tubes, and that the first chucking means comprises a first cylinder fixed to the movable head concentrically with the first and second tubes, a first piston received in the first cylinder so as to reciprocate by compressed oil in the axial direction of the first cylinder, a slider received in the first piston and made to reciprocate with the first piston in the axial direction of the first cylinder, a pusher fixed to one end of the slider, and a collet chuck concentrically disposed in the hollow spindle so as to be operated by the reciprocation of the pusher.

3. A friction welding machine according to claim 2 wherein said outer upset-removing device comprises a cutting tool having a cutting edge thereof engageable with the tubes and a fixture for fixing the cutting tool to the pusher of the first chucking means, whereby an outer upset grown at the joint of the first and second tubes is cut off by the outer upset-removing device.

4. A friction welding machine according to claim 1 wherein the outer upset-removing device is fixed to the stationary head concentrically with the first tube, said outer upset-removing device comprising more than one cutting tool having the inner peripheral surface provided with helical cutting edges having a semicircular cross section for cutting off an outer upset appearing at the joint of the first and second tubes.

5. A friction welding machine according to claim 1 wherein the outer upset-removing device is fixed to the movable head concentrically with the first tube, said outer upset-removing device comprising more than one cutting tool having the inner peripheral surface provided with more than one helical cutting edges for cutting off an outer upset grown at the joint of the first and second tubes.

6. A friction welding machine according to claim 1 wherein the cutter head has the outer peripheral surface thereof provided with helical cutting edges having a semicircular cross section.

7. A friction welding machine according to claim 1 wherein the tension rods are each provided with first engagement sections bearing saw teeth each having a cross section tapering toward the stationary head over the working area of the work rest and the tail stock and a second engagement section bearing saw teeth each having a cross section reversely tapering toward the stationary head over the working area of the support; the first and second clamping mechanisms are provided with engagement strips engageable with the saw teeth of the first engagement sections of the tension rods by the operation of said clamping mechanisms so as to clamp the work rest and tail stock to the tension rods; and the third clamping mechanism is provided with an engagement strip engageable with the saw teeth of the second engagement sections of the tension rods by the operation of said clamping mechanism so as to clamp the support to the tension rods.

8. A friction welding machine according to claim 1 wherein the third chucking means is provided with jaws each comprising an inner surface for holding the rear outer peripheral surface of the second tube and an abutment disposed adjacent to said inner surface and projecting into the third chucking means so as to engage the rear end face of the second tube.

* * * * *